(12) United States Patent
Kim

(10) Patent No.: US 12,358,363 B2
(45) Date of Patent: *Jul. 15, 2025

(54) POWER TRANSMISSION APPARATUS FOR HYBRID VEHICLE

(71) Applicant: Hyundai Transys Inc., Seosan-si (KR)

(72) Inventor: Tae Hoon Kim, Hwaseong-si (KR)

(73) Assignee: Hyundai Transys Inc., Seosan-si (KR)

( * ) Notice: Subject to any disclaimer, the term of this patent is extended or adjusted under 35 U.S.C. 154(b) by 69 days.

This patent is subject to a terminal disclaimer.

(21) Appl. No.: 18/066,736

(22) Filed: Dec. 15, 2022

(65) Prior Publication Data

US 2023/0256805 A1 Aug. 17, 2023

(30) Foreign Application Priority Data

Feb. 15, 2022 (KR) .................. 10-2022-0019565

(51) Int. Cl.
*B60K 6/40* (2007.10)
*B60K 6/26* (2007.10)
*B60K 6/36* (2007.10)
*B60K 6/387* (2007.10)
*F16H 57/029* (2012.01)
*F16H 57/02* (2012.01)

(52) U.S. Cl.
CPC .............. *B60K 6/40* (2013.01); *B60K 6/26* (2013.01); *B60K 6/36* (2013.01); *B60K 6/387* (2013.01); *F16H 57/029* (2013.01); *B60Y 2200/92* (2013.01); *F16H 2057/02034* (2013.01); *F16H 2057/02043* (2013.01)

(58) Field of Classification Search
CPC . B60K 6/26; B60K 6/36; B60K 6/387; B60K 6/40; F16H 2057/02034
See application file for complete search history.

(56) References Cited

U.S. PATENT DOCUMENTS

| | | | |
|---|---|---|---|
| 6,258,001 B1* | 7/2001 | Wakuta | B60K 6/48 903/952 |
| 12,030,385 B2* | 7/2024 | Kim | B60K 6/387 |
| 2019/0195312 A1* | 6/2019 | Führer | F16F 15/12353 |
| 2020/0094668 A1* | 3/2020 | Podschwadt | B60K 6/405 |

(Continued)

FOREIGN PATENT DOCUMENTS

| | | |
|---|---|---|
| DE | 10 2020 130 313 A1 | 11/2021 |
| DE | 10 2020 116 011 A1 | 12/2021 |
| DE | 10 2020 132 601 A1 | 1/2022 |

(Continued)

OTHER PUBLICATIONS

Villing, "Office Action for German Patent Application No. 10 2022 133 899.1", Jan. 7, 2025, GPTO, Germany.

*Primary Examiner* — William C Joyce

(74) *Attorney, Agent, or Firm* — Bridgeway IP Law Group, PLLC; Jihun Kim

(57) ABSTRACT

Provided is a power transmission apparatus for a hybrid vehicle, the power transmission apparatus including a connecting shaft having an edge portion connected to a mass by a connecting plate, the connecting shaft being coupled to an outer side of a first rotor shaft connected to a first rotor of a first motor, and a drive plate positioned adjacent to a crankshaft while facing the connecting shaft, the drive plate being configured to connect the mass and the crankshaft.

16 Claims, 3 Drawing Sheets

(56) References Cited

U.S. PATENT DOCUMENTS

2021/0356016 A1    11/2021  Kim

FOREIGN PATENT DOCUMENTS

| | | |
|---|---|---|
| DE | 10 2021 121 693 A1 | 2/2022 |
| JP | 2000-289475 A | 10/2000 |
| JP | 2002-103998 A | 4/2002 |
| JP | 2007-015441 A | 1/2007 |
| JP | 2010-006190 A | 1/2010 |
| JP | 2013-011324 A | 1/2013 |
| KR | 102238845 B1 | 4/2021 |
| KR | 10-2354073 B1 | 1/2022 |

* cited by examiner

POWER TRANSMISSION APPARATUS FOR HYBRID VEHICLE

CROSS-REFERENCE TO RELATED APPLICATIONS

This application claims priority to and the benefit of Korean Patent Application No. 10-2022-0019565 filed in the Korean Intellectual Property Office on Feb. 15, 2022, the entire contents of which are incorporated herein by reference.

TECHNICAL FIELD

The present invention relates to a power transmission apparatus for a hybrid vehicle.

BACKGROUND ART

In general, a motor used for a power transmission apparatus for a hybrid vehicle may operate to allow a vehicle to electrically travel at the initial time when an engine does not operate. In case that two motors (motors P1 and P2) are disposed in the power transmission apparatus for a hybrid vehicle, one motor may operate to start the engine, and the other motor may operate to allow the vehicle to electrically travel.

FIG. 1 is a view illustrating a power transmission apparatus for a hybrid vehicle in the related art. Referring to FIG. 1, a power transmission apparatus 1 for a hybrid vehicle in the related art includes: a motor housing 10 disposed between an engine 2 and a transmission 3; a first motor 20 disposed in the motor housing 10 and connected to a crankshaft 2b of the engine 2; a second motor 30 disposed in the motor housing 10 so as to be adjacent to the first motor 20 in an axial direction and connected to an input shaft 3b of the transmission 3; a torsion damper 40 disposed between the first motor 20 and the second motor 30 and having one side portion coupled to the first motor 20; and a clutch 50 installed on the second motor 30 and configured to selectively connect the second motor 30 and the torsion damper 40. The motor housing 10 is disposed between the engine 2 and the transmission 3 and coupled to a casing 2a of the engine and a casing 3a of the transmission. The motor housing 10 includes: a first motor housing 11 to which the first motor 20 is coupled; and a second motor housing 12 to which the second motor 30 is coupled, the second motor housing 12 having one side portion connected to the first motor housing 11, and the other side portion connected to the casing 3a of the transmission. The first motor housing 11 includes: a first cover portion 111 coupled to the second motor housing 12 and the engine 2 and configured to define a first space portion S1 in which at least a part of the first motor 20 may be embedded; a second space portion S2 provided in the second motor housing 12; a first stator support portion 112 provided at an inner end of the first cover portion 111 that adjoins the first space portion S1, the first stator support portion 112 being configured such that a stator of the first motor 20 is fixedly installed on the first stator support portion 112; a first inner wall portion 113 extending from the first stator support portion 112 toward the first space portion S1 and disposed to face the engine 2; a first rotor support portion 114 extending from the first inner wall portion 113 in the axial direction and configured to support a rotor of the first motor 20; and a first opening portion 115 formed in a central portion of the first inner wall portion 113 and opened so that the rotor of the first motor 20 is connected to the crankshaft 2b of the engine 2.

In the power transmission apparatus for a hybrid vehicle in the related art, a rotor shaft 20a of the motor P1 is spline-coupled to a connecting shaft 2c. However, the spline has backlash to implement smooth assembling, and the backlash causes a splined tooth surface clearance of the connecting shaft, which produces rattling noise when power is transmitted from the engine. In case that an assembling hole is formed in an engine clutch retainer, a working fluid, which is supplied between the engine clutch retainer and an engine clutch piston, leaks toward a bearing through the assembling hole, which causes a problem in that working hydraulic pressure required to operate an engine clutch cannot be created, and the engine clutch cannot operate.

Accordingly, the present invention is intended to provide a mechanism in which the connecting shaft of the engine is connected without clearance, and the assembling hole provided in the engine clutch retainer is sealed by a sealing cover, such that working hydraulic pressure is created between the engine clutch retainer and the engine clutch piston, which makes it possible to enable the engine clutch to operate smoothly.

DOCUMENT OF RELATED ART

Patent Document (Patent Document 1) Korean Patent No. 10-2238845 (published on Apr. 12, 2021)

SUMMARY OF THE INVENTION

To solve the above-mentioned problems, an object of the present invention is to provide a power transmission apparatus for a hybrid vehicle, in which a connecting shaft of an engine is connected without clearance, and an assembling hole provided in an engine clutch retainer is sealed by a sealing cover, such that working hydraulic pressure is created between the engine clutch retainer and an engine clutch piston, which makes it possible to enable an engine clutch to operate smoothly.

To achieve the above-mentioned object, the present invention provides a power transmission apparatus for a hybrid vehicle, the power transmission apparatus including: a connecting shaft having an edge portion connected to a mass by a connecting plate, the connecting shaft being coupled to an outer side of a first rotor shaft connected to a first rotor of a first motor; and a drive plate positioned adjacent to a crankshaft while facing the connecting shaft, the drive plate being configured to connect the mass and the crankshaft.

The connecting shaft may be spline-coupled to an outer diameter portion of the first rotor shaft that protrudes in a direction toward the crankshaft.

A first stepped portion and a second stepped portion may be provided on a portion of the first rotor shaft exposed toward the crankshaft when the first rotor shaft is coupled to the connecting shaft.

A locking nut may be screw-coupled to an outer periphery of the first stepped portion, and the first stepped portion may have an outer diameter smaller than an outer diameter of the portion of the first rotor shaft spline-connected to the connecting shaft.

The second stepped portion may have a smaller outer diameter than the first stepped portion, extend in a direction from the first stepped portion toward the crankshaft, and be inserted into the crankshaft.

A first inner wall portion may be provided between the mass, the connecting plate, and the first motor, a hub may be integrated with a center portion of the first inner wall portion and surrounds the first rotor shaft, and an oil seal for implementing watertightness may be provided between an outer diameter portion of the connecting shaft and an inner diameter portion of the hub.

The power transmission apparatus may further include: an engine clutch retainer provided adjacent to a second motor opposite to the first motor and having an assembling hole; a bolt assembled through the assembling hole; and a sealing cover configured to seal the assembling hole.

The engine clutch retainer may be positioned between an input shaft support and an engine clutch piston.

The bolt may be fixedly assembled, through the assembling hole, to a bearing mounted on the input shaft support.

The engine clutch retainer may have an accommodation portion to which the sealing cover is coupled, and the accommodation portion may communicate with the assembling hole provided adjacent to the bearing mounted on the input shaft support.

The bearing mounted on the input shaft support may have a rim portion, and the rim portion may be provided on an outer periphery of the bearing mounted on the input shaft support and have a coupling hole to which the bolt is coupled.

The engine clutch retainer may be integrated with a second rotor of the second motor provided opposite to the first motor.

The bearing mounted on the input shaft support may support the engine clutch retainer so that the engine clutch retainer is rotatable.

The first motor and the second motor may be mounted in a first motor housing and a second motor housing, the first motor may be connected to the crankshaft of an engine, and the second motor may be connected to a transmission input shaft.

A torsion damper may be disposed between the first motor and the second motor, and the torsion damper may have one side portion coupled to the first motor.

An engine clutch may be installed on the second motor, and the engine clutch may selectively connect the second motor and the torsion damper.

The first motor housing may be coupled to one side of the second motor housing, and a transmission casing may be coupled to the other side of the second motor housing.

The first motor housing may have a first inner wall portion, a first resolver may be mounted on the first inner wall portion, the second motor housing may have a second inner wall portion, and a second resolver may be mounted on the second inner wall portion or the input shaft support.

According to the present invention, the connecting shaft of the engine is connected without clearance, which makes it possible to prevent the occurrence of rattling noise when power is transmitted from the engine.

According to the present invention, the assembling hole provided in the engine clutch retainer is sealed by the sealing cover, such that working hydraulic pressure is created between the engine clutch retainer and the engine clutch piston, which makes it possible to enable the engine clutch to operate smoothly.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
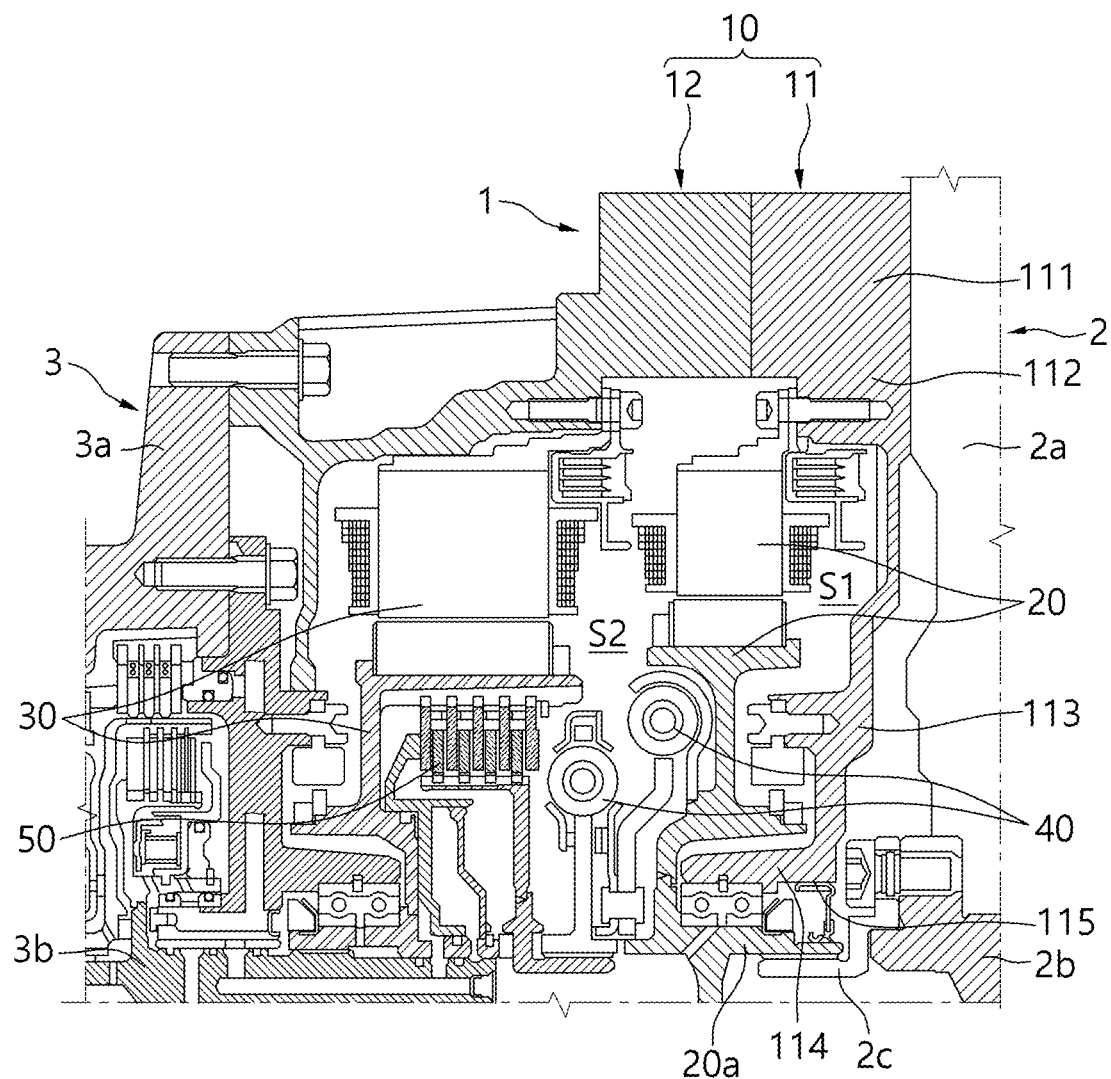
FIG. 1 is a view illustrating a power transmission apparatus for a hybrid vehicle in the related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. First, in assigning reference numerals to constituent elements of the respective drawings, it should be noted that the same constituent elements will be designated by the same reference numerals, if possible, even though the constituent elements are illustrated in different drawings. In addition, in the description of the present invention, the specific descriptions of publicly known related configurations or functions will be omitted when it is determined that the specific descriptions may obscure the subject matter of the present invention. Further, the exemplary embodiments of the present invention will be described below, but the technical spirit of the present invention is not limited thereto and may of course be modified and variously carried out by those skilled in the art.

Figure 2:
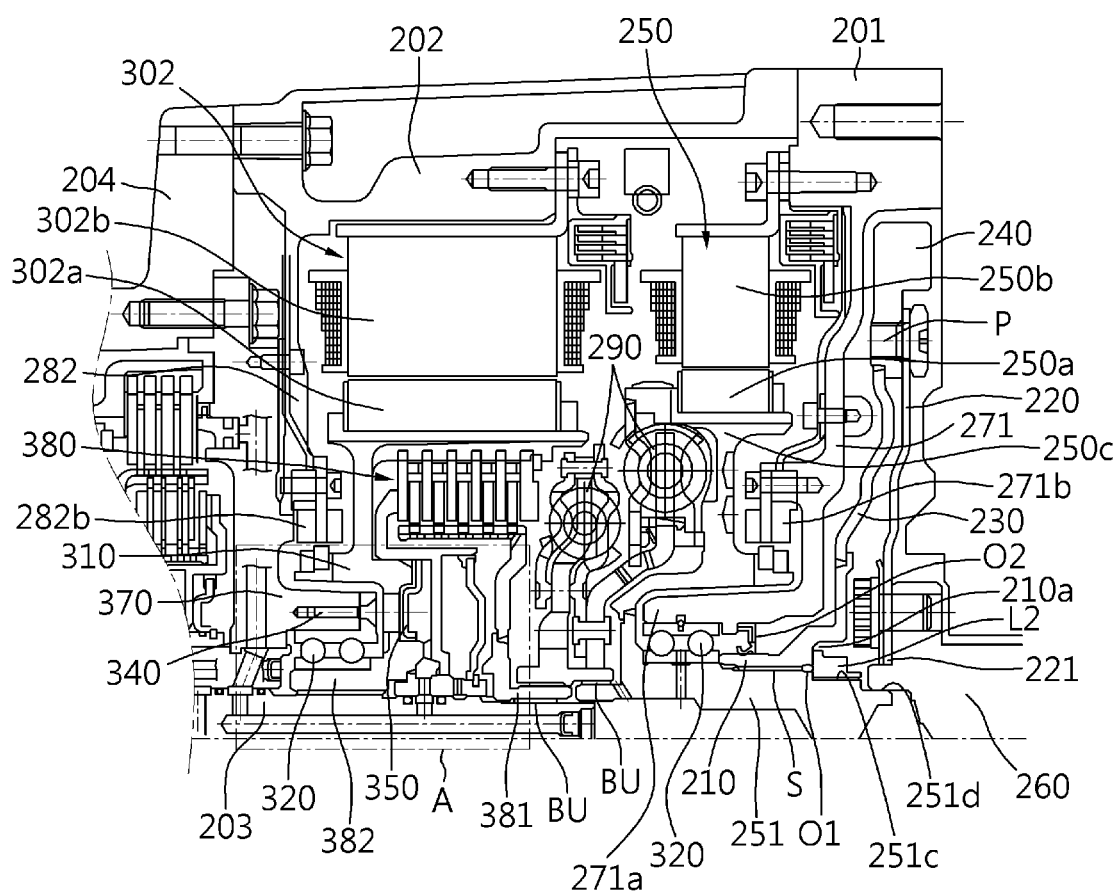
FIG. 2 is a view illustrating a power transmission apparatus for a hybrid vehicle according to an exemplary embodiment of the present invention.
Figure 3:
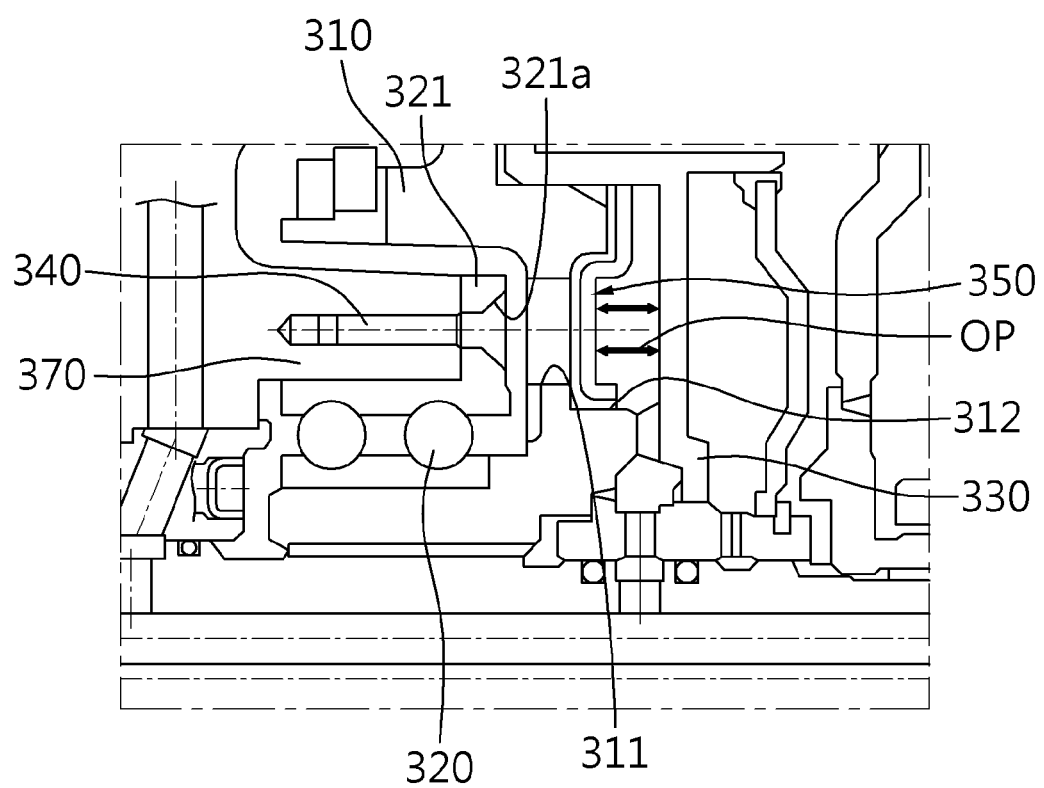
FIG. 3 is an enlarged view of part A in FIG. 2.

FIG. 2 is a view illustrating a power transmission apparatus for a hybrid vehicle according to an exemplary embodiment of the present invention, and FIG. 3 is an enlarged view of part A in FIG. 2.

As illustrated in FIG. 2, a power transmission apparatus for a hybrid vehicle of the present invention includes: a connecting shaft 210 connected to a first rotor shaft 251 of a first motor 250 and having an edge connected to a mass 240; and a drive plate 220 configured to connect the mass 240 and a crankshaft 260 of an engine. The first motor 250 includes a first rotor 250a and a first stator 250b.

The connecting shaft 210 is coupled to an outer diameter portion of the first rotor shaft 251 by means of splines S. The connecting shaft 210 may be integrated with the first rotor 250a by being welded to a first rotor sleeve 250c of the first rotor 250a.

In a state in which the connecting shaft 210 is coupled to the first rotor shaft 251, a locking nut L2 is coupled to a portion of the first rotor shaft 251 exposed toward the crankshaft 260, such that the connecting shaft 210 is locked.

The locking nut L2 may be inserted into and in close contact with an insertion portion 210a provided in one surface of the connecting shaft 210 when the locking nut L2 is assembled.

The connecting shaft 210 may be connected to the mass 240 by a connecting plate 230. For example, the connecting plate 230 may be connected to the connecting shaft 210 and the mass 240 by welding.

A center portion of the connecting plate 230 may be connected to the connecting shaft 210, and an edge portion of the connecting plate 230 may be connected to the mass 240.

The mass 240 is a weight member. When the connecting shaft 210 rotates together with the first rotor shaft 251, rotational inertia is additionally applied by a weight of the mass 240, such that vibration caused by the rotation operation may be reduced.

The drive plate 220 is positioned adjacent to the crankshaft 260 of the engine and spaced apart from the connecting shaft 210 at a predetermined interval. A boss 221 is provided at a center of the drive plate 220.

A bolt is coupled to assemble the boss 221 and the crankshaft 260 in a state in which the crankshaft 260 is coupled to a center of the boss 221 provided on the drive plate 220.

An edge portion of the drive plate 220 is connected to the mass 240. A bolt is coupled to a pitch circle P of the drive plate 220, such that the drive plate 220 and the mass 240 may be securely connected.

A first inner wall portion 271 may be provided between the first motor 250 and an assembly of the mass 240 and the connecting plate 230. The inner wall portion 271 may be integrated with a first motor housing 201.

A hub 271a may be integrated with a center of the first inner wall portion 271. The hub 271a of the first inner wall portion 271 may be assembled to have a structure that surrounds the first rotor shaft 251 and the connecting shaft 210.

An oil seal O2 may be provided between an outer diameter portion of the connecting shaft 210 and an inner diameter portion of the hub 271a in a state in which the connecting shaft 210 is assembled to the first rotor shaft 251. The oil seal O2 implements watertightness between the outer diameter portion of the connecting shaft 210 and the inner diameter portion of the hub 271a.

The first rotor shaft 251 may be rotatably supported by a bearing 320 mounted in the hub 271a.

A first stepped portion 251c and a second stepped portion 251d may be sequentially formed toward the crankshaft 260 and provided on a coupling portion of the first rotor shaft 251 coupled to the connecting shaft 210.

The first stepped portion 251c and the second stepped portion 251d are portions that are not coupled to the connecting shaft 210.

The first stepped portion 251c has a smaller outer diameter than the outer diameter portion of the first rotor shaft 251 to which the connecting shaft 210 is coupled.

The first stepped portion 251c is a portion to which the locking nut L2 is coupled. The first stepped portion 251c has a width corresponding to a horizontal width of the locking nut L2. A threaded portion may be formed on an outer periphery of the first stepped portion 251c, such that the locking nut L2 may be screw-coupled to the first stepped portion 251c.

The second stepped portion 251d is connected to the first stepped portion 251c and extends in a direction from the first stepped portion 251c toward the crankshaft 260. The second stepped portion 251d has a smaller outer diameter than the first stepped portion 251c.

For example, two or more bolts are required to assemble the connecting plate 230 and the first rotor shaft 251. However, according to the present invention, the connecting plate 230 and the first rotor shaft 251 may be assembled by the single connecting shaft 210 connected to the connecting plate 230, which makes it possible to reduce the number of components to be assembled in comparison with the configuration in the related art in which the assembling is performed by the bolts.

For example, in the state in which the connecting shaft 210 is coupled to the first rotor shaft 251, the locking nut L2 is coupled to the first stepped portion 251c, and then caulking may be performed to prevent the locking nut L2 from being loosened.

Because the second stepped portion 251d of the first rotor shaft 251 is fitted into the crankshaft 260 during the assembling process, the first rotor shaft 251 and the crankshaft 260 may be securely assembled. As the first rotor shaft 251 and the crankshaft 260 are securely assembled, a rotation balance of the first rotor 250a of the first motor 250 may be improved.

Because the second stepped portion 251d is inserted into the crankshaft 260, the first rotor shaft 251 may be stably supported, which makes it possible to stably maintain concentricity and reduce noise vibration.

The watertightness may be implemented, by an O-ring O1, between spline-connection portions of the first rotor shaft 251 and the connecting shaft 210 with which the locking nut L2 is in close contact. The O-ring O1 may be pressed by the locking nut L2, such that the O-ring O1 may be in close contact with the spline-connection portions (S) of the first rotor shaft 251 and the connecting shaft 210.

A torsion damper 290 may be connected to the first rotor 250a of the first motor 250. The torsion damper 290 may be installed between the engine (not illustrated) and the transmission (not illustrated) and reduce torsional vibration periodically generated on a transmission input shaft 203 during a process of transmitting power.

As illustrated in FIGS. 2 and 3, an engine clutch retainer 310 may be integrated with a second rotor 302a so that the engine clutch retainer 310 may also serve as a rotor sleeve for the second rotor 302a.

An assembling hole 311, through which a bolt 340 may pass, is formed in the engine clutch retainer 310. After the bolt 340 is completely assembled through the assembling hole 311, the assembling hole 311 is blocked by the sealing cover 350 to prevent an oil leak through the assembling hole 311, which makes it possible to prevent a leak of working hydraulic pressure OP from an engine clutch 380.

For example, the sealing cover 350 may have various structures, such as a structure in which a seal made of a rubber material is attached to a steel plate, which are capable of performing a sealing function.

The engine clutch retainer 310 is positioned between an engine clutch piston 330 and the bearing 320 mounted on an input shaft support 370.

For example, the engine clutch retainer 310 may be integrated with the second rotor 302a of the second motor 302. The assembling hole 311 of the engine clutch retainer 310 is penetratively formed toward the bearing 320 mounted on the input shaft support 370.

For example, the bearing 320 mounted on the input shaft support 370 may be a double ball bearing.

The second motor 302 includes the second rotor 302a and a second stator 302b.

The assembling hole 311 may be formed as a hole having a sufficient size that enables the bolt 340 to freely pass through the assembling hole 311 at the time of assembling the bolt 340.

The bolt 340 is coupled to a rim portion 321 of the bearing 320 mounted on the input shaft support 370. The bearing 320 mounted on the input shaft support 370 may be securely coupled to the input shaft support 370 by the bolt 340.

The assembling hole 311 is sealed by the sealing cover 350 after the bolt 340 is assembled. Because the assembling hole 311 is sealed by the sealing cover 350, an oil leak through the assembling hole 311 may be prevented, such that a leak of the working hydraulic pressure OP from the engine clutch 380 may be prevented.

The working hydraulic pressure OP may be created between the engine clutch retainer 310 and the engine clutch piston 330, such that the engine clutch 380 may operate smoothly.

An accommodation portion 312 is provided in the engine clutch retainer 310. The accommodation portion 312 is provided adjacent to the engine clutch piston 330, and the assembling hole 311 is provided adjacent to the bearing 320 mounted on the input shaft support 370. The accommodation portion 312 communicates with the assembling hole 311 while defining a concentric circle. The accommodation portion 312 is configured as a hole larger than the assembling hole 311.

The bearing 320 mounted on the input shaft support 370 has the rim portion 321. The rim portion 321 extends outward from an outer periphery of the bearing 320 mounted on the input shaft support 370. A coupling hole 321a is provided in the rim portion 321. For example, the coupling hole 321a may have a shape corresponding to a head portion of the bolt 340 so that the head portion of the bolt 340 may be accommodated in the coupling hole 321a.

The bolt 340 passes through the assembling hole 311 and is screw-coupled to the input shaft support 370 in a state in which the bolt 340 is inserted into the coupling hole 321a.

The bolt 340 is assembled in a state in which the assembling hole 311, the coupling hole 321a, and the screw-coupling portion of the input shaft support 370 are positioned on a straight line.

The bearing 320 mounted on the input shaft support 370 supports the engine clutch retainer 310 so that the engine clutch retainer 310 is rotatable in the state in which the bearing 320 is fixed to the input shaft support 370 by the bolt 340.

The first motor 250 and the second motor 302 are mounted in the first motor housing 201 and the second motor housing 202. The first motor 250 is connected to the crankshaft 260 of the engine. The second motor 302 is connected to the transmission input shaft 203. The torsion damper 290 is disposed between the first motor 250 and the second motor 302. One side portion of the torsion damper 290 may be coupled to the first motor 250.

The engine clutch 380 is installed on the second motor 302. The engine clutch 380 may selectively connect the second motor 302 and the torsion damper 290.

The first motor housing 201 is coupled to one side of the second motor housing 202. A transmission casing 204 may be coupled to the other side of the second motor housing 202.

The first motor housing 201 has the first inner wall portion 271. A first resolver 271b may be mounted on the first inner wall portion 271. The second motor housing 202 has a second inner wall portion 282. A second resolver 282b may be mounted on the second inner wall portion 282 or the input shaft support 370.

A bushing BU may be mounted between the first rotor shaft 251 and the torsion damper 290.

The bushing BU may be mounted between the transmission input shaft 203 and the engine clutch hub 381.

A second rotor shaft 382 may be provided at a center of the engine clutch retainer 310. The second rotor shaft 382 is rotatably supported by the bearing 320 mounted on the input shaft support 370.

The second rotor shaft 382 is coupled to an outer side of the transmission input shaft 203. The second rotor shaft 382 and the transmission input shaft 203 may be spline-coupled.

The above description is simply given for illustratively describing the technical spirit of the present invention, and those skilled in the art to which the present invention pertains will appreciate that various modifications, changes, and substitutions are possible without departing from the essential characteristic of the present invention. Accordingly, the embodiments disclosed in the present invention and the accompanying drawings are intended not to limit but to describe the technical spirit of the present invention, and the scope of the technical spirit of the present invention is not limited by the embodiments and the accompanying drawings. The protective scope of the present invention should be construed based on the following claims, and all the technical spirit in the equivalent scope thereto should be construed as falling within the scope of the present invention.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A power transmission apparatus for a hybrid vehicle, the power transmission apparatus comprising:
   a connecting shaft having an edge portion connected to a mass by a connecting plate, the connecting shaft being coupled to an outer side of a first rotor shaft connected to a first rotor of a first motor;
   a drive plate disposed adjacent to a crankshaft while facing the connecting shaft, the drive plate being configured to connect the mass and the crankshaft;
   an engine clutch retainer disposed adjacent to a second motor disposed opposite to the first motor, the engine clutch retainer having an assembling hole;
   a bolt disposed through the assembling hole; and
   a sealing cover configured to seal the assembling hole.

2. The power transmission apparatus of claim 1, wherein the connecting shaft is spline-coupled to an outer diameter portion of the first rotor shaft that protrudes in a direction toward the crankshaft.

3. The power transmission apparatus of claim 2,
   wherein a first stepped portion and a second stepped portion are disposed on a portion of the first rotor shaft exposed toward the crankshaft, and wherein a locking nut is screw-coupled to an outer periphery of the first stepped portion, and the first stepped portion has an outer diameter smaller than the outer diameter portion of the first rotor shaft spline-connected to the connecting shaft.

4. The power transmission apparatus of claim 3, wherein the second stepped portion has a smaller outer diameter than the outer diameter of the first stepped portion, extends in a direction from the first stepped portion toward the crankshaft, and is inserted into the crankshaft.

5. The power transmission apparatus of claim 1,
wherein a first inner wall portion is disposed between an assembly of the mass and the connecting plate and the first motor,
wherein a hub is integrated with a center portion of the first inner wall portion and surrounds the first rotor shaft, and
wherein an oil seal configured to implement watertightness is disposed between an outer diameter portion of the connecting shaft and an inner diameter portion of the hub.

6. The power transmission apparatus of claim 1, wherein the engine clutch retainer is disposed between an input shaft support and an engine clutch piston.

7. The power transmission apparatus of claim 6, wherein the bolt is fixed, through the assembling hole, to a bearing mounted on the input shaft support.

8. The power transmission apparatus of claim 7, wherein the engine clutch retainer is integrated with a second rotor of the second motor disposed opposite to the first motor.

9. The power transmission apparatus of claim 7, wherein the first motor and the second motor are mounted in a first motor housing and a second motor housing, the first motor is connected to the crankshaft of an engine, and the second motor is connected to a transmission input shaft.

10. The power transmission apparatus of claim 7, wherein a torsion damper is disposed between the first motor and the second motor, and the torsion damper has one side portion coupled to the first motor.

11. The power transmission apparatus of claim 10, wherein an engine clutch is disposed on the second motor, and the engine clutch is configured to selectively connect the second motor and the torsion damper.

12. The power transmission apparatus of claim 7, wherein a first motor housing is coupled to one side of a second motor housing, and a transmission casing is coupled to another side of the second motor housing.

13. The power transmission apparatus of claim 7, wherein a first motor housing has a first inner wall portion, a first resolver is mounted on the first inner wall portion, a second motor housing has a second inner wall portion, and a second resolver is mounted on the second inner wall portion or the input shaft support.

14. The power transmission apparatus of claim 6, wherein the engine clutch retainer has an accommodation portion to which the sealing cover is coupled, and the accommodation portion is configured to communicate with the assembling hole defined adjacent to a bearing mounted on the input shaft support.

15. The power transmission apparatus of claim 14, wherein the bearing mounted on the input shaft support has a rim portion, and the rim portion is disposed on an outer periphery of the bearing mounted on the input shaft support and has a coupling hole to which the bolt is coupled.

16. The power transmission apparatus of claim 14, wherein the bearing mounted on the input shaft support is configured to support the engine clutch retainer so that the engine clutch retainer is rotatable.

* * * * *